Feb. 12, 1935.　　　A. L. STILES　　　1,990,757
VEHICLE BODY CONSTRUCTION
Filed April 15, 1933　　3 Sheets-Sheet 1
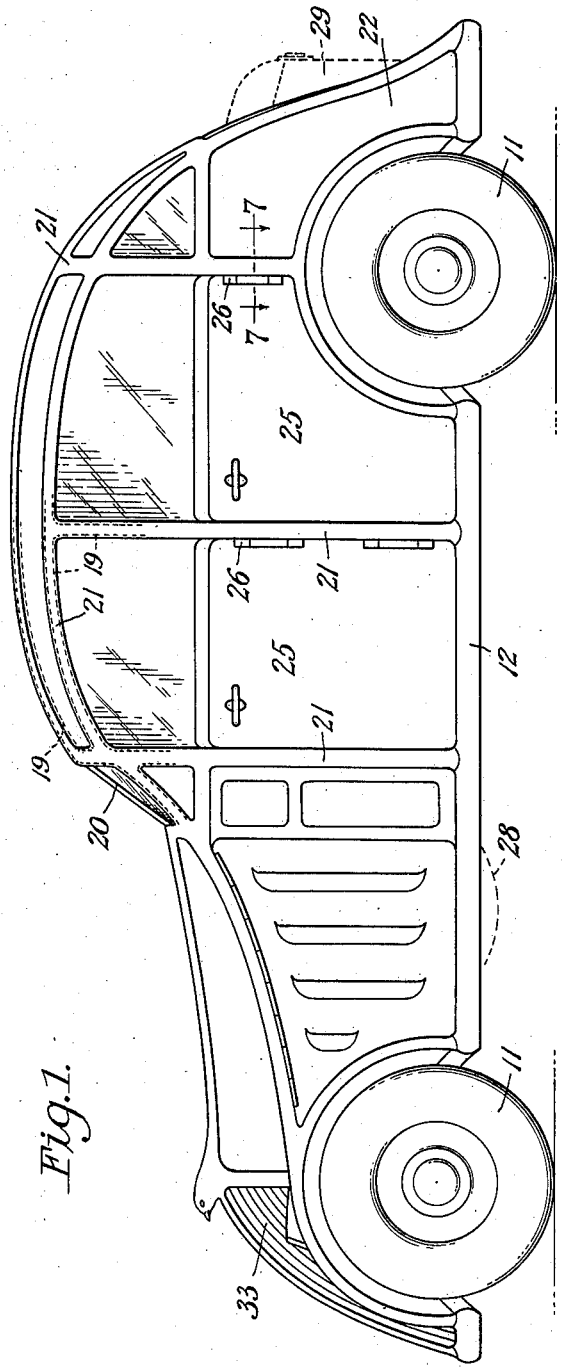
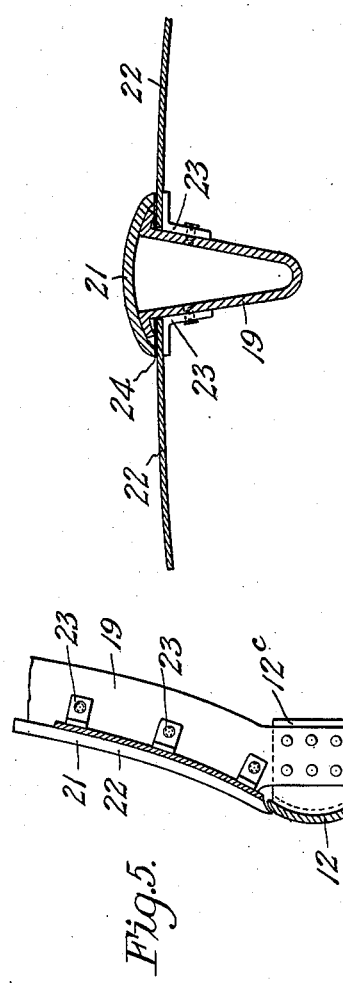
Inventor
ARTHUR L. STILES
By Dowell & Dowell
Attorneys.

Feb. 12, 1935. A. L. STILES 1,990,757
VEHICLE BODY CONSTRUCTION
Filed April 15, 1933   3 Sheets-Sheet 2

Inventor

ARTHUR L. STILES

By Dowell & Dowell
Attorneys.

Feb. 12, 1935.   A. L. STILES   1,990,757
VEHICLE BODY CONSTRUCTION
Filed April 15, 1933   3 Sheets-Sheet 3
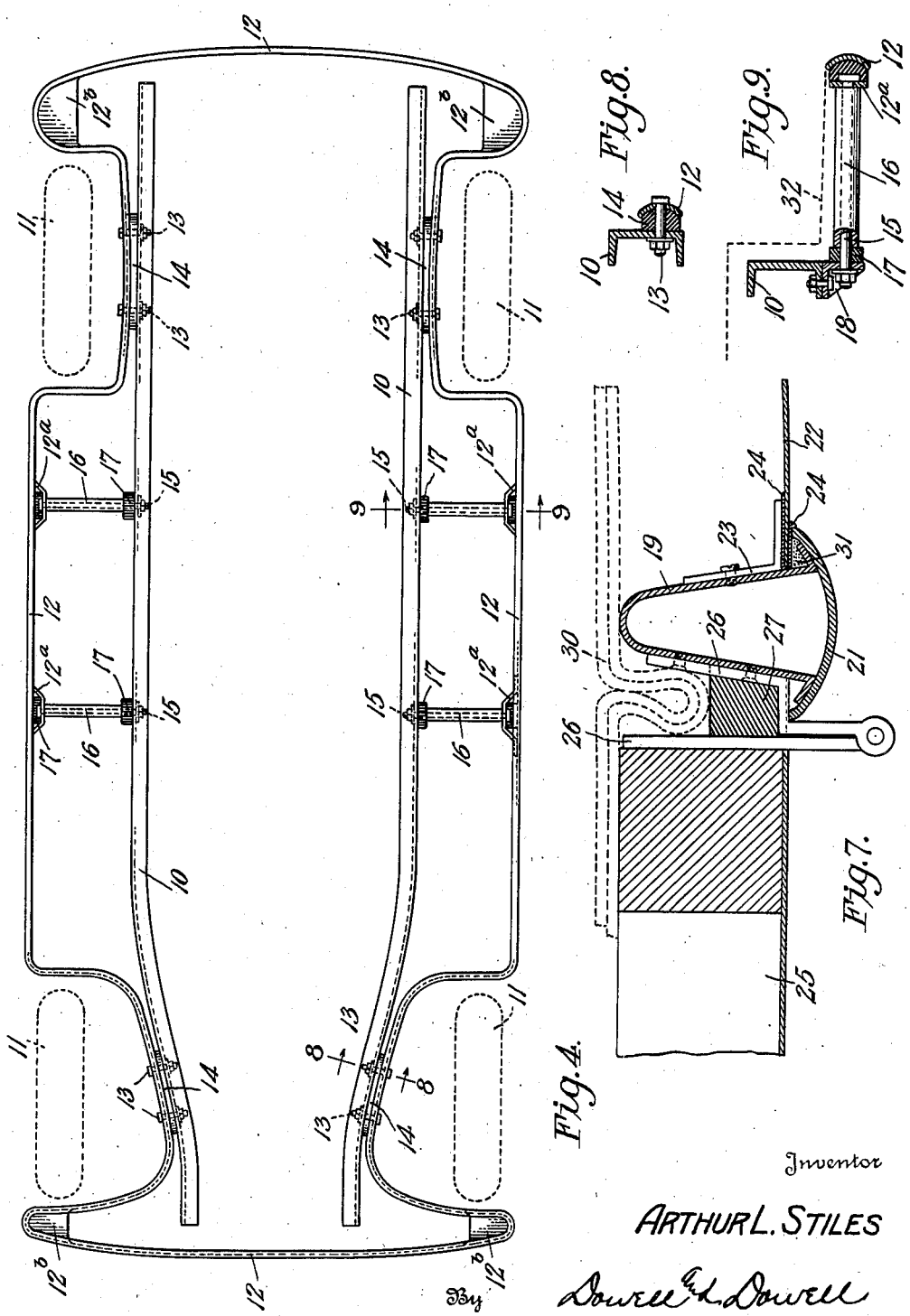
Inventor
ARTHUR L. STILES Patented Feb. 12, 1935

1,990,757

UNITED STATES PATENT OFFICE 1,990,757

VEHICLE BODY CONSTRUCTION

Arthur L. Stiles, Elmira, N. Y.

Application April 15, 1933, Serial No. 666,365

7 Claims. (Cl. 296—28)

This invention is intended to provide a novel and improved vehicle body construction, with reference more particularly to automobiles and motor coaches.

Its primary object is to produce a safety body for the protection of the occupants and the vehicle itself in case of accident, combined with lightness, minimized wind resistance, facilitation of repair, and originality of design. Simplicity and economy in manufacture are further desiderata had in view.

Other objects in addition to the general concept and advantages of the invention will be best understood from the following description with reference to the appended drawings illustrating one practicable embodiment of the same in a pleasure car construction.

In said drawings:

Fig. 1 is a side elevation of the car showing its stream-line build;

Fig. 4 is a plan view of the car chassis with basic part of the body applied;

Fig. 5 is a fragmentary enlarged sectional view through the base member, such as taken on the line 5—5 of Fig. 3;

Fig. 6 is an enlarged sectional view through one of the frame members and associated parts, such as taken on the line 6—6 of Fig. 2;

Fig. 7 is a section taken on the line 7—7 of Fig. 1 on a greatly enlarged scale;

Fig. 8 is an enlarged section on the line 8—8 of Fig. 4; and

Fig. 9 is a similar section on the line 9—9 of the same figure.

Figure 2:
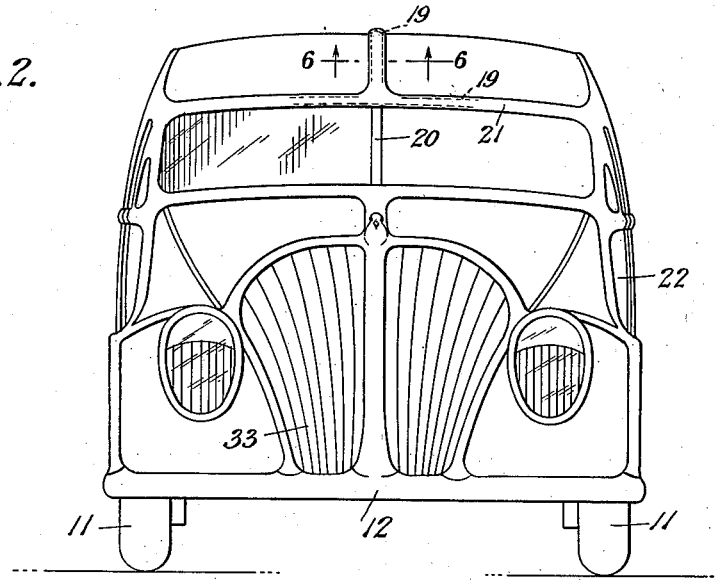
Fig. 2 is a front end elevation thereof.
Figure 3:
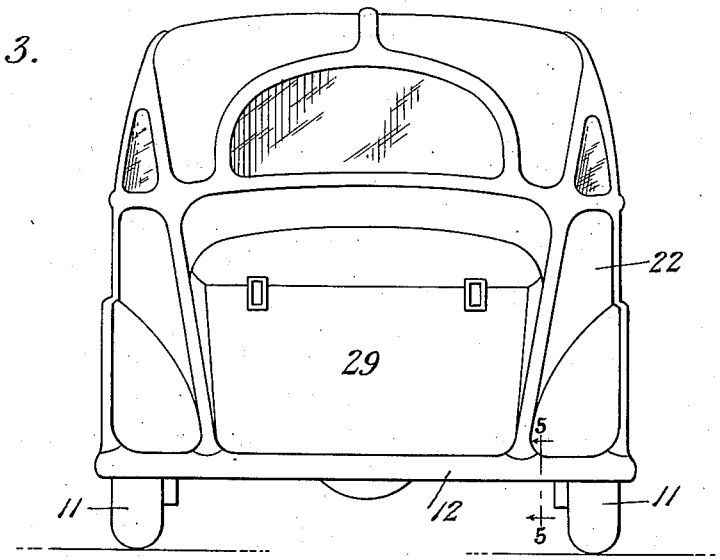
Fig. 3 is a rear end elevation of the same.

In the illustrative construction, a conventional type of automobile chassis is represented by the beam members 10 (see Fig. 4) mounted on wheels 11 in the manner common to such vehicles.

Onto the chassis, a frame-like member is fixed, comprising a stout metal rail or bar 12 extending completely around the same. This is fitted to the chassis so as to space and project the greater extent of its length beyond the same at both sides and ends without interfering with the drive and running gear parts of the vehicle. It is secured firmly upon the chassis by suitable connections at the sides and ends, so as to withstand sidewise ramming and also support the superstructure of the vehicle. For such purpose it is preferred to have the frame or rail bend inwardly behind and around the wheels as shown (see Fig. 4) and to effect its main attachment to the chassis at these points.

The attachment in this instance is made by dual bolts 13 over the axles and a liner or washer 14 of rubber or the like resilient is here applied between the rail and chassis for pliability and shock-absorption purposes. Intermediate these points, longer bolts 15 at the sides augment the attachment with added strength and rigidity. These longer bolts extend through tubular tie-bars 16 between the rail and chassis and engage in bracket or lug portions 12a of the rail. Rubber or other resilient washers 17 are also desirably placed under the heads or ends of each for the like purpose of pliability and the absorption of shock. If the frame or rail is underslung or stepped below the level of the chassis as in this instance, these intermediate connections are made to chassis hangers 18 (see Fig. 9) instead of direct to the chassis. In that case the rail bends upward as well as inward behind the wheels (see Fig. 1) for the main attachment.

The frame or rail (12) so applied and adapted to support the superstructure body of the vehicle provides a continuous rebound bumper therearound to prevent damage from collision or ramming. It thus serves a two-fold purpose. For greater strength in resisting forces of impact, the rail may advantageously be formed with web-portions 12b within its angles of critical bend or curve, as shown in Fig. 4. If desired, springs or rubber cushions may also be applied between it and the ends of the chassis.

Supported upon said rail are transverse and longitudinal truss members 19 interconnected with each other in an overarch frame structure formed with openings for the doors and desired windows. These members comprise light but very strong metal bars of V-shaped section built into such structure with their open sides or edges disposed outward. They are fastened endwise upon the rail by bolting or riveting to stout lug portions 12c, or to the aforementioned bracket-portions 12a thereof, as represented in Fig. 5. Similarly or by other appropriate means they are connected with each other at the points of intersection. Together with the rail, these members then form a rigid and exceedingly strong frame structure. This rigidity will be aided and the entire structure greatly reinforced by cross-bracing (not shown) between the parts as is common to structures of the kind. One of the longitudinal truss members overarches or partially overarches the frame area of the rail in its center plane and so provides a top beam to prevent crushing in if the vehicle should overturn, while the transverse truss members overarch said area at intervals along its length to give the necessary support to said longitudinal member and to others which auxiliate it. The several members together of course give proper form and shape to the body, including the usual cowl and motor hood. Added support and strength may be given to the top member or beam by providing a metal brace 20 across the windshield space between the cowl and crown truss members.

Lengthwise over the open sides or edges of the several truss members, moulding strips 21 are secured firmly as by screwing or welding to the edge or flange portions of said members (see Fig. 6). These strips are arcuate in cross section and over-extend said edges or flange portions of the members a slight distance along their entire length. They serve thus to close the clefts of the members and give a finished apperance of mould or beading to the body which is ultimately formed.

In the spaces—other than those for the doors and windows—between the intersecting truss members and between said members and the rail or basic frame-member, panel plates 22 of light sheet metal are fitted to close the same and give final form to the car body, any bulge or surface curvature necessary to the desired contour of the body being incorporated in the plates as is commonly done. The truss members are thus utilized as panel moulds as well as structural parts of the body frame. These plates are secured in place, with their edges underlying the edges of the moulding strips (21), in a manner to be removable easily for replacement or repair in case of damage from collision or other accident. This is shown accomplished by a series of brackets or clamp-shoes 23 (see Figs. 5 and 6) screwed or riveted to the sides of the truss members behind or under the panels, so as to press and hold them with their edges tight against the overextended edges of said moulding strips in a vise-like pinch between the two. A rubberized fabric strip 24 is advantageously interposed between their contacting surfaces to eliminate friction and squeak as also to effect a water-tight joint. A waterproof plastic cement may also be used to fill the joint and effect a tighter bind of the parts.

By this arrangement it will be seen that the panels are separately susceptible of removal and replacement as occasion may require, either by loosening and removing the clamp shoes (23) holding the same, or by removing the moulding strips from the truss members, depending upon which is adapted to removal for the purpose. If the moulding strips are to be so adapted, it will of course be necessary to make the flange portions of the V-shaped truss members turn inward instead of outward, in order to permit the panels to be withdrawn. On the other hand, if the clamp shoes are adapted to the purpose, it will be necessary to first loosen and draw aside a part of the upholstering lining of the body. In either case however, the panels are quite readily accessible and the possibility of individual removal for repair or replacement has decided advantage over the type of body wherein the surface shell is all in one piece.

Within the openings provided for such purpose, doors 25 are fitted in the usual way. These doors may be of panel mould formation like the body proper, or solid, as preferred. Fig. 7 illustrates a plan section at the point of hinging one of the doors in place. In this the supporting hinge 26 is shown bolted to the side of one of the transverse truss members of the body structure similarly to the clamp shoes which hold the panels. The moulding strip (21) along said member bears upon a part of the hinge and aids in giving it rigidity. Along the edge between the hinge arms, a rubber bumper or jamb 27 is secured the full length or height of the door opening to prevent friction or rattle and to seal the joint against the weather.

It will be understood that certain of the panel plates (22) may be similarly hinged to afford access to compartment spaces. For example, the rear side panels may be hinged for admission to the space built into a rear compartment for carrying a spare tire, or the cowel panels may be hinged for access to spaces utilized as tool or other carrier compartments. The motor space is of course covered by the usual folding hood, but this space is large enough for spare tire carriage at the sides and wells as indicated at 28 may therefore be formed in the same, which the hood or separate casings may be designed to enclose. A trunk is represented at 29 in the rear end of the body. This may be separate or formed in the body proper, or it may be dispensed with if a spare tire is to be carried in the rear.

In the aforementioned Fig. 7, the inner upholstering lining of the body is represented by 30 in dotted lines. This is shown gathered in a fold at the door juncture to permit free opening, but it may of course be otherwise adapted to this purpose and a continuous liner is not essential nor does it form any part of the present invention. Said figure also illustrates on larger scale the joint between truss member and panel plate parts of the body structure. Here the rubberized fabric strip (24) is shown folded over both sides of the panel and the waterproof cement which may desirably fill the joint of the parts is represented at 31.

From the foregoing it will be understood that the car body in this instance has the full width or nearly the full width of the rail frame on the chassis and that it extends down to a level well below the chassis. A very roomy body is accordingly formed to admit of exceptionally wide seats and the need of a running board onto which persons may jump is eliminated. It is desirable however to provide an inner running board or steps behind the doors, which may be or may not be covered over by false floor plates when the doors are closed. A possible line of interior floor and step is indicated by the dotted line 32 in Fig. 9. The usual fenders over the rear wheels are of course formed in the body of a width to overextend them, while the fenders over the front wheels are formed by the frame structure and panel plates applied thereto.

Over the usual radiator section, a grating 33 extending to the bumper gives pleasing line and form to the vehicle while also adding to its general stream-line effect in low build and rakish contour.

Thus is provided a novel vehicle body structure and design, wherein the base member supporting the body on the chassis forms a part of said body and forms also a continuous bumper therearound. Various modifications in form and in the assembly or arrangement of parts and their unity may of course be made according to the kind, size and appearance of vehicle desired, without departing from the scope of the invention: As such is contemplated and only the general concept of the invention is here set forth, it is not intended that the appended claims shall limit the same to the specific example or detail or construction herein illustrated and described.

Having thus described my invention, what I declare is new and desire to secure by Letters Patent of the United States is:

1. In combination with a vehicle chassis, a bumper rail extending in laterally spaced relation continuously around the chassis with a bending inwardly theretoward around the wheels to points of support attachment, the same being supported on the chassis resiliently by connections at the sides behind and between the wheels; said rail constituting a member of and the support for the body structure of the vehicle.

2. In combination with a vehicle chassis, a bumper bar extending continuously around the same in spaced lateral relation thereto with a bending inwardly theretoward around the wheel spaces to points of support-fastening to the chassis behind such spaces; said bar providing part of and support for a body on the chassis.

3. In combination with a vehicle chassis having a mounting on wheels, a bumper bar supporting and forming part of a body structure; said bar extending continuously around the chassis in laterally spaced relation thereto in all parts except the wheel locations and being at such locations bent inwardly around and behind the wheels to points of connection with the chassis over the wheel axles.

4. In combination with a vehicle chassis, a bumper bar supported on and extending continuously and conformatively around the chassis in spaced projection therebeyond except at the wheel locations and at such locations bending inwardly around and behind the spaces of the wheels to points of attachment to the chassis; said bar serving as part of and the support for the body structure of the vehicle.

5. In combination with a vehicle chassis mounted on wheels, a combined bumper, body-frame and body supporting member comprising a bar supported on the chassis by attachments thereto behind the wheels over their axles; said bar extending continuously around the chassis in projected spacing therefrom throughout the greater part of its length and at the wheel locations bending inwardly to the chassis around the wheels to the points of attachment therebehind, and means securing the bar to the chassis at such attachment points in cushioned and resilient fixture thereto.

6. A vehicle body structure comprising in combination with a chassis having a mounting on wheels, a combined bumper, body frame and body supporting member comprising a bar extending continuously around the chassis in laterally spaced relation thereto and a level below the same at all points except the wheel locations and at such locations bending inwardly and upwardly to the chassis laterally around and behind the wheels to points of attachment to the chassis over the wheel axles, means securing the bar to the chassis at such attachment points, transverse and longitudinal frame members mounted upon said bar as a base and interconnected with each other in unit body-forming relation, and panel plates secured in the spaces between said interconnected frame members to form the body shell.

7. A vehicle body structure, comprising in combination with a chassis having a mounting on wheels, a combined bumper and base member comprising a bar extending continuously around the chassis in spaced projection therebeyond at all points except the wheel locations and at such locations bending inwardly thereto around and behind the wheels, means attaching the bar in support upon the chassis at the points of bending thereto behind the wheels, and a body frame built upon and supported by said bar providing a part of the same.

ARTHUR L. STILES.